US012664374B2

(12) United States Patent
McNamara et al.

(10) Patent No.: US 12,664,374 B2
(45) Date of Patent: Jun. 23, 2026

(54) METHOD AND SYSTEM FOR CAPTURING AND STORING MACHINE LEARNED QUANTITATIVE CLASSIFICATION OF NATURAL LANGUAGE DATA

(71) Applicant: JPMorgan Chase Bank, N.A., New York, NY (US)

(72) Inventors: Kevin J McNamara, Newfoundland, NJ (US); Rohit Talreja, Hyderabad (IN); Paul Oreto, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 247 days.

(21) Appl. No.: 18/236,511

(22) Filed: Aug. 22, 2023

(65) Prior Publication Data

US 2025/0013833 A1 Jan. 9, 2025

(30) Foreign Application Priority Data

Jul. 7, 2023 (IN) .............................. 202311045802

(51) Int. Cl.
*G06F 40/20* (2020.01)
*G06F 40/226* (2020.01)
*G06F 40/40* (2020.01)
*G10L 17/22* (2013.01)

(52) U.S. Cl.
CPC ............ *G06F 40/40* (2020.01); *G06F 40/226* (2020.01); *G06F 40/20* (2020.01); *G10L 17/22* (2013.01)

(58) Field of Classification Search
CPC ....... G10L 15/22; G10L 17/22; G06F 40/247; G06F 40/20
See application file for complete search history.

(56) References Cited

U.S. PATENT DOCUMENTS

| | | | | |
|---|---|---|---|---|
| 6,567,778 B1* | 5/2003 | Chao Chang | ......... | G06F 40/295 704/275 |
| 2011/0161073 A1* | 6/2011 | Lesher | ................. | G06F 40/247 704/E11.001 |
| 2018/0210703 A1* | 7/2018 | Meyers | ................... | G10L 15/00 |

OTHER PUBLICATIONS

Marchenko, et al. "Improving Text Generation Through Introducing Coherence Metrics," Cybernetics and Systems Analysis, Jan. 2020. (Year: 2020).*

Marchenko, "Improving Text Generation Through Introducing Coherence Metrics," Cybernetics and Systems Analysis, Jan. 2020. (Year: 2020).*

* cited by examiner

*Primary Examiner* — Feng-Tzer Tzeng

(74) *Attorney, Agent, or Firm* — Greenblum & Bernstein, P.L.C.

(57) ABSTRACT

A method for facilitating qualitative assessment of natural language data via artificial intelligence is disclosed. The method includes receiving, via an application programming interface, an input from a source, the input including the natural language data; determining, by using a model, a confidence score for the input, the confidence score relating to a clarity level of the natural language data; determining, by using the model, whether the confidence score exceeds a predetermined threshold; generating, by using the model, a request for additional information when the confidence score is below the predetermined threshold, the request including a prompt in a natural language format; and transmitting, via the application programming interface, the request back to the source.

11 Claims, 5 Drawing Sheets

400

100

102

300

400

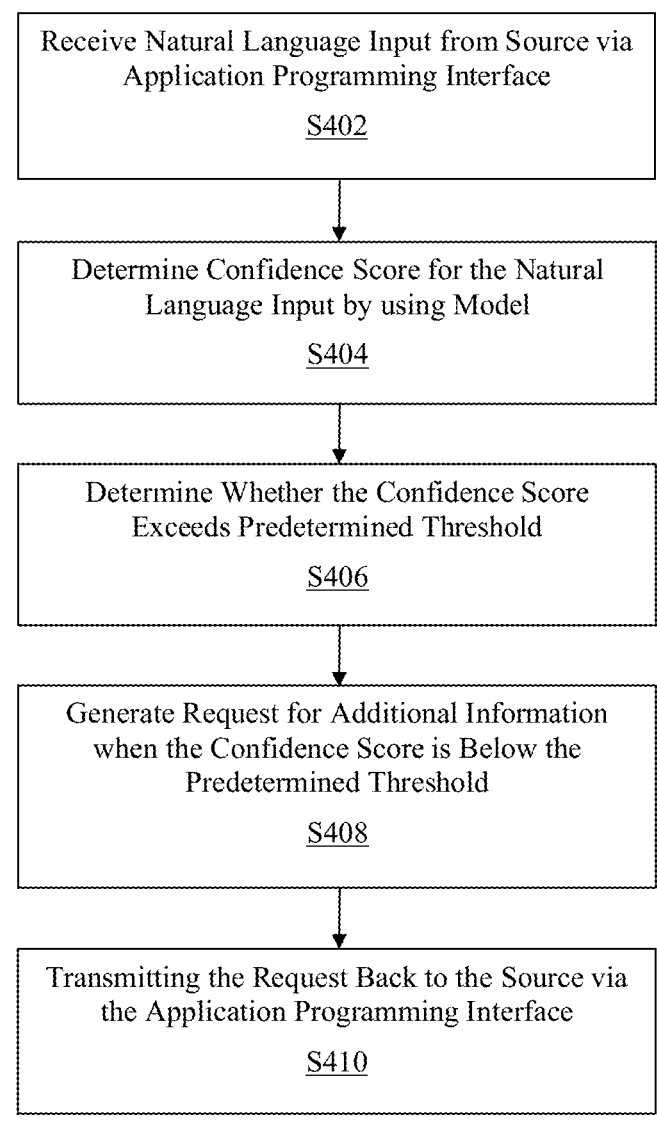

Receive Natural Language Input from Source via
Application Programming Interface

S402

Determine Confidence Score for the Natural
Language Input by using Model

S404

Determine Whether the Confidence Score
Exceeds Predetermined Threshold

S406

Generate Request for Additional Information
when the Confidence Score is Below the
Predetermined Threshold

S408

Transmitting the Request Back to the Source via
the Application Programming Interface

METHOD AND SYSTEM FOR CAPTURING AND STORING MACHINE LEARNED QUANTITATIVE CLASSIFICATION OF NATURAL LANGUAGE DATA

CROSS-REFERENCE TO RELATED APPLICATIONS

This application claims the benefit of Indian Provisional Patent Application No. 202311045802, filed Jul. 7, 2023, which is hereby incorporated by reference in its entirety.

BACKGROUND

1. Field of the Disclosure

This technology generally relates to methods and systems for assessing natural language data, and more particularly to methods and systems for providing an automated machine learning solution that leverages artificial intelligence to facilitate qualitative assessment of natural language data in real-time.

2. Background Information

Many business entities aggregate and use large quantities of natural language data to facilitate business activities and provide services for users. Often, high quality natural language data that includes all necessary information for various functionalities are required. Historically, implementations of conventional qualitative assessment techniques have resulted in varying degrees of success with respect to effectively and efficiently flagging natural language data that is unclear and/or incomplete.

One drawback of using the conventional qualitative assessment techniques is that in many instances, usability of the natural language data may only be ascertained after extensive processing to convert the unstructured data sets into structured data sets. As a result, resources may have been expended on potentially unusable data that is unclear and/or incomplete. In addition, due to the additional required conversions, the conventional qualitative assessment techniques may not be effectively accomplished in real-time.

Therefore, there is a need for an automated machine learning solution that leverages artificial intelligence to facilitate qualitative assessment of natural language data in real-time for subsequent downstream processes.

SUMMARY

The present disclosure, through one or more of its various aspects, embodiments, and/or specific features or sub-components, provides, inter alia, various systems, servers, devices, methods, media, programs, and platforms for providing an automated machine learning solution that leverages artificial intelligence to facilitate qualitative assessment of natural language data in real-time.

According to an aspect of the present disclosure, a method for facilitating qualitative assessment of natural language data via artificial intelligence is disclosed. The method is implemented by at least one processor. The method may include receiving, via an application programming interface, an input from at least one source, the input may include the natural language data; determining, by using at least one model, at least one confidence score for the input, the at least one confidence score may relate to a clarity level of the natural language data; determining, by using the at least one model, whether the at least one confidence score exceeds a predetermined threshold; generating, by using the at least one model, at least one request for additional information when the at least one confidence score is below the predetermined threshold, the at least one request may include a prompt in a natural language format; and transmitting, via the application programming interface, the at least one request back to the at least one source.

In accordance with an exemplary embodiment, the method may further include receiving, via the application programming interface, a subsequent input from the at least one source in response to the at least one request, the subsequent input may include the additional information; determining, by using the at least one model, at least one new confidence score based on the input and the subsequent input; and determining, by using the at least one model, whether the at least one new confidence score exceeds the predetermined threshold.

In accordance with an exemplary embodiment, the input may be automatically split into a plurality of constituent inputs based on the subsequent input and the at least one new confidence score, each of the plurality of constituent inputs may include contextually distinct subject matter.

In accordance with an exemplary embodiment, the method may further include determining at least one destination for the input when the at least one confidence score exceeds the predetermined threshold; associating the input with the at least one confidence score; and transmitting the input and the associated at least one confidence score to the at least one destination.

In accordance with an exemplary embodiment, the at least one destination may correspond to at least one downstream application, the at least one destination may include network location information for the transmitting.

In accordance with an exemplary embodiment, the clarity level may include at least one from among a clear level, a high clarity level, a medium clarity level, and a low clarity level, the clarity level may correspond to a predicted coherency characteristic of the natural language data.

In accordance with an exemplary embodiment, to determine the at least one confidence score, the method may further include parsing, by using the at least one model, the input to identify at least one linguistic element; and determining, by using the at least one model, the at least one confidence score for the input based on the at least one linguistic element.

In accordance with an exemplary embodiment, the method may further include determining, by using the at least one model, a context for each of the at least one linguistic element based on word sense disambiguation; and determining, by using the at least one model, the at least one confidence score for the input based on the at least one linguistic element and the corresponding context.

In accordance with an exemplary embodiment, the at least one model may include at least one from among a natural language processing model, a machine learning model, a mathematical model, a process model, and a data model.

According to an aspect of the present disclosure, a computing device configured to implement an execution of a method for facilitating qualitative assessment of natural language data via artificial intelligence is disclosed. The computing device including a processor; a memory; and a communication interface coupled to each of the processor and the memory, wherein the processor may be configured to receive, via an application programming interface, an input from at least one source, the input may include the natural language data; determine, by using at least one model, at least one confidence score for the input, the at least one confidence score may relate to a clarity level of the natural language data; determine, by using the at least one model, whether the at least one confidence score exceeds a predetermined threshold; generate, by using the at least one model, at least one request for additional information when the at least one confidence score is below the predetermined threshold, the at least one request may include a prompt in a natural language format; and transmit, via the application programming interface, the at least one request back to the at least one source.

In accordance with an exemplary embodiment, the processor may be further configured to receive, via the application programming interface, a subsequent input from the at least one source in response to the at least one request, the subsequent input may include the additional information; determine, by using the at least one model, at least one new confidence score based on the input and the subsequent input; and determine, by using the at least one model, whether the at least one new confidence score exceeds the predetermined threshold.

In accordance with an exemplary embodiment, the processor may be further configured to automatically split the input into a plurality of constituent inputs based on the subsequent input and the at least one new confidence score, each of the plurality of constituent inputs may include contextually distinct subject matter.

In accordance with an exemplary embodiment, the processor may be further configured to determine at least one destination for the input when the at least one confidence score exceeds the predetermined threshold; associate the input with the at least one confidence score; and transmit the input and the associated at least one confidence score to the at least one destination.

In accordance with an exemplary embodiment, the at least one destination may correspond to at least one downstream application, the at least one destination may include network location information for the transmitting.

In accordance with an exemplary embodiment, the clarity level may include at least one from among a clear level, a high clarity level, a medium clarity level, and a low clarity level, the clarity level may correspond to a predicted coherency characteristic of the natural language data.

In accordance with an exemplary embodiment, to determine the at least one confidence score, the processor may be further configured to parse, by using the at least one model, the input to identify at least one linguistic element; and determine, by using the at least one model, the at least one confidence score for the input based on the at least one linguistic element.

In accordance with an exemplary embodiment, the processor may be further configured to determine, by using the at least one model, a context for each of the at least one linguistic element based on word sense disambiguation; and determine, by using the at least one model, the at least one confidence score for the input based on the at least one linguistic element and the corresponding context.

In accordance with an exemplary embodiment, the at least one model may include at least one from among a natural language processing model, a machine learning model, a mathematical model, a process model, and a data model.

According to an aspect of the present disclosure, a non-transitory computer readable storage medium storing instructions for facilitating qualitative assessment of natural language data via artificial intelligence is disclosed. The storage medium including executable code which, when executed by a processor, may cause the processor to receive, via an application programming interface, an input from at least one source, the input may include the natural language data; determine, by using at least one model, at least one confidence score for the input, the at least one confidence score may relate to a clarity level of the natural language data; determine, by using the at least one model, whether the at least one confidence score exceeds a predetermined threshold; generate, by using the at least one model, at least one request for additional information when the at least one confidence score is below the predetermined threshold, the at least one request may include a prompt in a natural language format; and transmit, via the application programming interface, the at least one request back to the at least one source.

In accordance with an exemplary embodiment, when executed by the processor, the executable code may further cause the processor to receive, via the application programming interface, a subsequent input from the at least one source in response to the at least one request, the subsequent input may include the additional information; determine, by using the at least one model, at least one new confidence score based on the input and the subsequent input; and determine, by using the at least one model, whether the at least one new confidence score exceeds the predetermined threshold.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for providing an automated machine learning solution that leverages artificial intelligence to facilitate qualitative assessment of natural language data in real-time.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
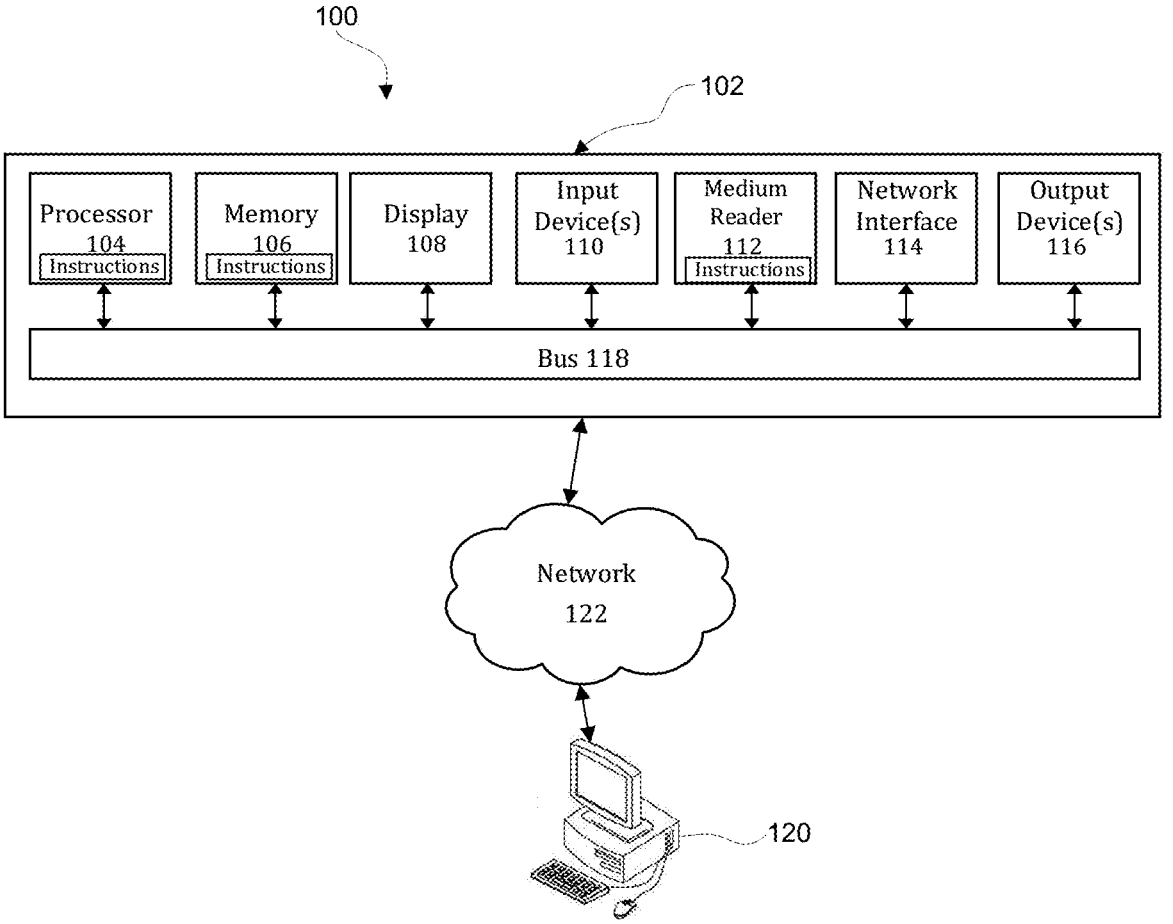
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an automated machine learning solution that leverages artificial intelligence to facilitate qualitative assessment of natural language data in real-time.

Figure 2:
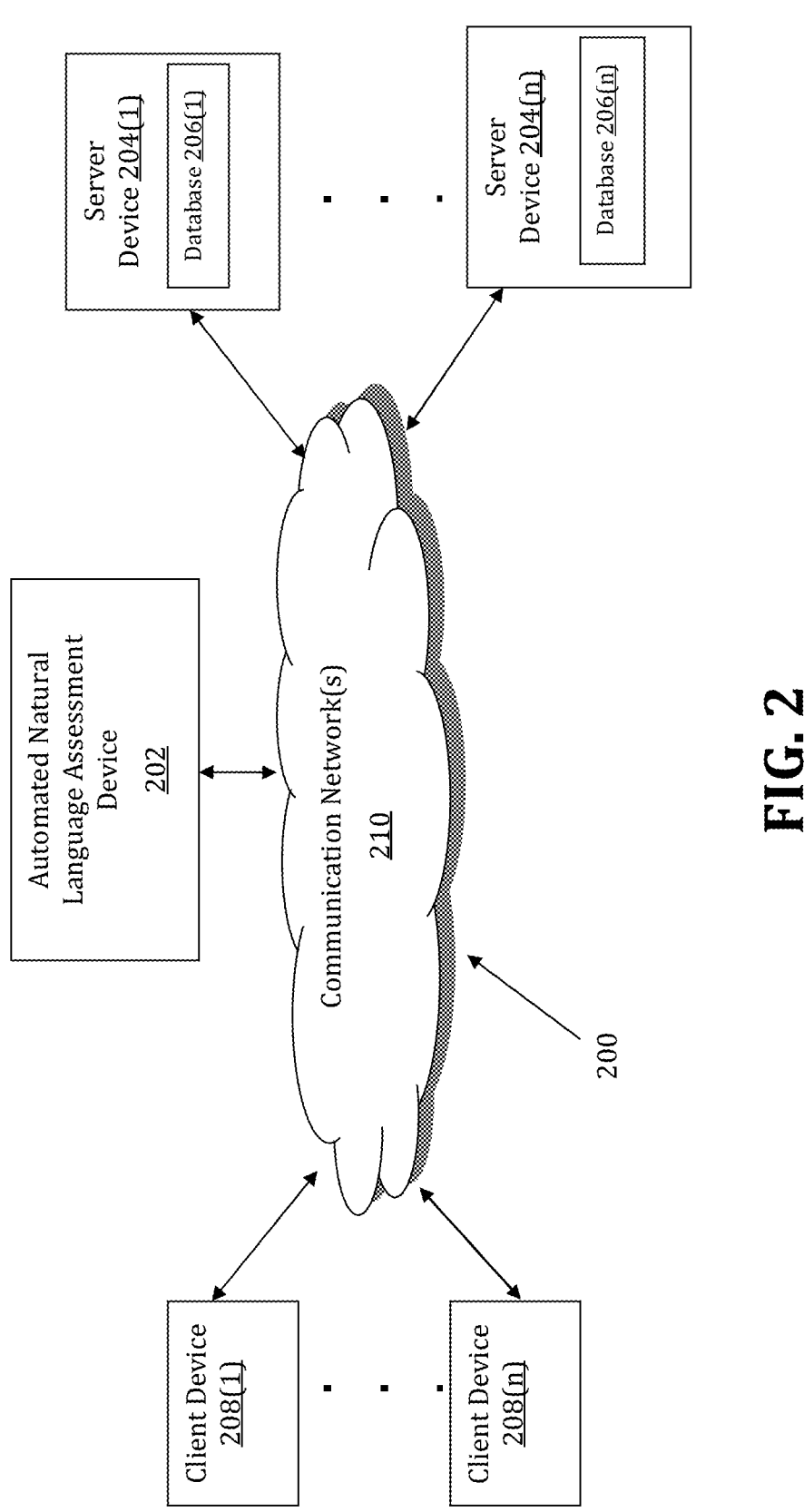
FIG. 2 illustrates an exemplary diagram of a network environment.

Referring to FIG. 2, a schematic of an exemplary network environment 200 for implementing a method for providing an automated machine learning solution that leverages artificial intelligence to facilitate qualitative assessment of natural language data in real-time is illustrated. In an exemplary embodiment, the method is executable on any networked computer platform, such as, for example, a personal computer (PC).

The method for providing an automated machine learning solution that leverages artificial intelligence to facilitate qualitative assessment of natural language data in real-time may be implemented by an Automated Natural Language Assessment (ANLA) device 202. The ANLA device 202 may be the same or similar to the computer system 102 as described with respect to FIG. 1. The ANLA device 202 may store one or more applications that can include executable instructions that, when executed by the ANLA device 202, cause the ANLA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plug-ins, or the like.

Even further, the application(s) may be operative in a cloud-based computing environment. The application(s) may be executed within or as virtual machine(s) or virtual server(s) that may be managed in a cloud-based computing environment. Also, the application(s), and even the ANLA device 202 itself, may be located in virtual server(s) running in a cloud-based computing environment rather than being tied to one or more specific physical network computing devices. Also, the application(s) may be running in one or more virtual machines (VMs) executing on the ANLA device 202. Additionally, in one or more embodiments of this technology, virtual machine(s) running on the ANLA device 202 may be managed or supervised by a hypervisor.

In the network environment 200 of FIG. 2, the ANLA device 202 is coupled to a plurality of server devices 204(1)-204 (*n*) that hosts a plurality of databases 206(1)-206 (*n*), and also to a plurality of client devices 208(1)-208 (*n*) via communication network(s) 210. A communication interface of the ANLA device 202, such as the network interface 114 of the computer system 102 of FIG. 1, operatively couples and communicates between the ANLA device 202, the server devices 204(1)-204 (*n*), and/or the client devices 208(1)-208 (*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ANLA device 202, the server devices 204 (1)-204 (*n*), and/or the client devices 208(1)-208 (*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ANLA devices that efficiently implement a method for providing an automated machine learning solution that leverages artificial intelligence to facilitate qualitative assessment of natural language data in real-time.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ANLA device 202 may be a standalone device or integrated with one or more other devices or apparatuses, such as one or more of the server devices 204(1)-204 (n), for example. In one particular example, the ANLA device 202 may include or be hosted by one of the server devices 204(1)-204 (n), and other arrangements are also possible. Moreover, one or more of the devices of the ANLA device 202 may be in a same or a different communication network including one or more public, private, or cloud networks, for example.

The plurality of server devices 204(1)-204 (n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204 (n) in this example may process requests received from the ANLA device 202 via the communication network(s) 210 according to the HTTP-based and/or JavaScript Object Notation (JSON) protocol, for example, although other protocols may also be used.

The server devices 204(1)-204 (n) may be hardware or software or may represent a system with multiple servers in a pool, which may include internal or external networks. The server devices 204(1)-204 (n) hosts the databases 206(1)-206 (n) that are configured to store data that relates to inputs, natural language data, machine learning models, confidence scores, clarity levels, predetermined thresholds, additional information, prompts, requests, subsequent inputs, and new confidence scores.

Although the server devices 204(1)-204 (n) are illustrated as single devices, one or more actions of each of the server devices 204(1)-204 (n) may be distributed across one or more distinct network computing devices that together comprise one or more of the server devices 204(1)-204 (n). Moreover, the server devices 204(1)-204 (n) are not limited to a particular configuration. Thus, the server devices 204(1)-204 (n) may contain a plurality of network computing devices that operate using a controller/agent approach, whereby one of the network computing devices of the server devices 204(1)-204 (n) operates to manage and/or otherwise coordinate operations of the other network computing devices.

The server devices 204(1)-204 (n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208 (n) may also be the same or similar to the computer system 102 or the computer device 120 as described with respect to FIG. 1, including any features or combination of features described with respect thereto. For example, the client devices 208 (1)-208 (n) in this example may include any type of computing device that can interact with the ANLA device 202 via communication network(s) 210. Accordingly, the client devices 208(1)-208 (n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208 (n) may run interface applications, such as standard web browsers or standalone client applications, which may provide an interface to communicate with the ANLA device 202 via the communication network(s) 210 in order to communicate user requests and information. The client devices 208(1)-208 (n) may further include, among other features, a display device, such as a display screen or touchscreen, and/or an input device, such as a keyboard, for example.

Although the exemplary network environment 200 with the ANLA device 202, the server devices 204(1)-204 (n), the client devices 208(1)-208 (n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ANLA device 202, the server devices 204(1)-204 (n), or the client devices 208(1)-208(n), for example, may be configured to operate as virtual instances on the same physical machine. In other words, one or more of the ANLA device 202, the server devices 204(1)-204(n), or the client devices 208(1)-208 (n) may operate on the same physical device rather than as separate devices communicating through communication network(s) 210. Additionally, there may be more or fewer ANLA devices 202, server devices 204(1)-204 (n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
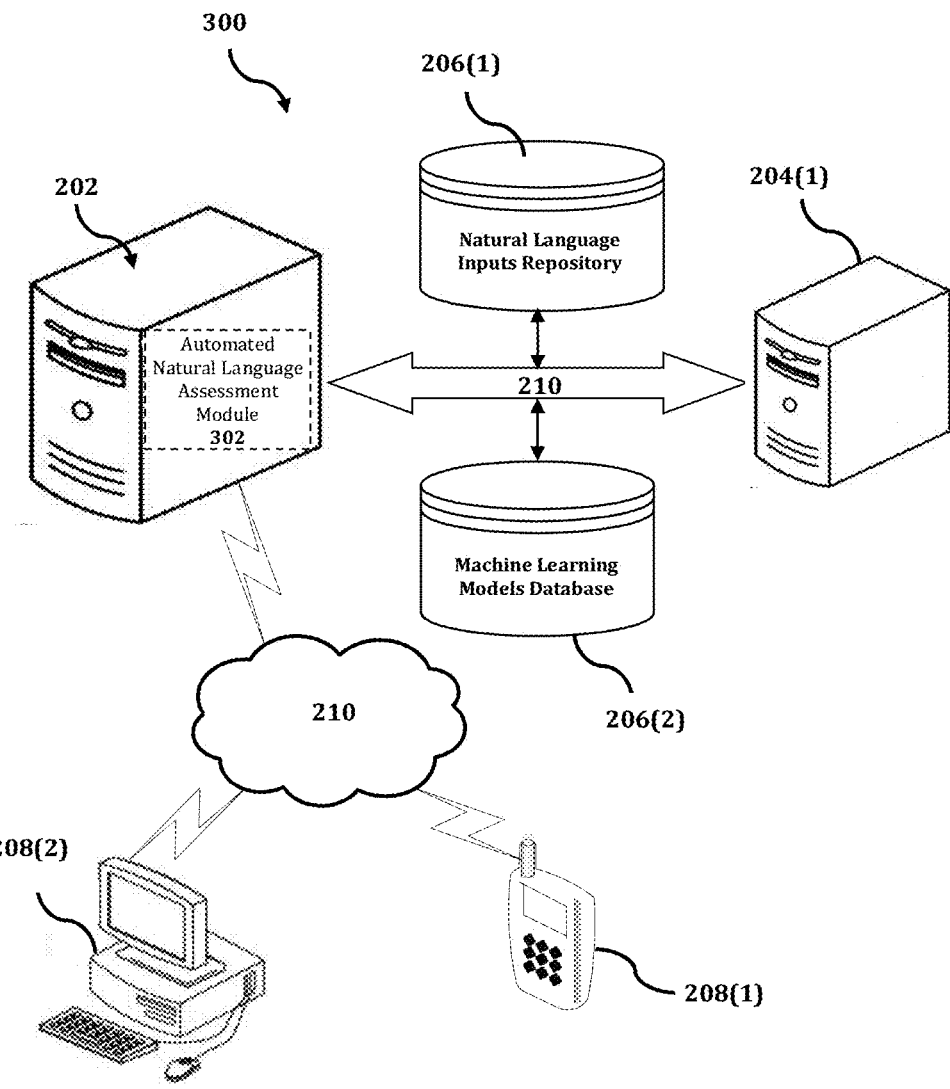
FIG. 3 shows an exemplary system for implementing a method for providing an automated machine learning solution that leverages artificial intelligence to facilitate qualitative assessment of natural language data in real-time.

The ANLA device 202 is described and shown in FIG. 3 as including an automated natural language assessment module 302, although it may include other rules, policies, modules, databases, or applications, for example. As will be described below, the automated natural language assessment module 302 is configured to implement a method for providing an automated machine learning solution that leverages artificial intelligence to facilitate qualitative assessment of natural language data in real-time.

An exemplary process 300 for implementing a mechanism for providing an automated machine learning solution that leverages artificial intelligence to facilitate qualitative assessment of natural language data in real-time by utilizing the network environment of FIG. 2 is shown as being executed in FIG. 3. Specifically, a first client device 208(1) and a second client device 208(2) are illustrated as being in communication with ANLA device 202. In this regard, the first client device 208(1) and the second client device 208(2) may be "clients" of the ANLA device 202 and are described herein as such. Nevertheless, it is to be known and understood that the first client device 208(1) and/or the second client device 208(2) need not necessarily be "clients" of the ANLA device 202, or any entity described in association therewith herein. Any additional or alternative relationship may exist between either or both of the first client device 208(1) and the second client device 208(2) and the ANLA device 202, or no relationship may exist.

Further, ANLA device 202 is illustrated as being able to access a natural language inputs repository 206(1) and a machine learning models database 206(2). The automated natural language assessment module 302 may be configured to access these databases for implementing a method for providing an automated machine learning solution that leverages artificial intelligence to facilitate qualitative assessment of natural language data in real-time.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ANLA device 202 via broadband or cellular communication. Of course, these embodiments are merely exemplary and are not limiting or exhaustive.

Upon being started, the automated natural language assessment module 302 executes a process for providing an automated machine learning solution that leverages artificial intelligence to facilitate qualitative assessment of natural language data in real-time. An exemplary process for providing an automated machine learning solution that leverages artificial intelligence to facilitate qualitative assessment of natural language data in real-time is generally indicated at flowchart 400 in FIG. 4.

In the process 400 of FIG. 4, at step S402, inputs may be received from a variety of sources. The inputs may be received via an application programming interface. In an exemplary embodiment, the inputs may include natural language data such as, for example, audio data and textual data that is provided by a user to a computing platform. The inputs may include unstructured natural language data as well as structured natural language data. The natural language data may include information in a variety of natural languages such as, for example, an English language.

In another exemplary embodiment, the variety of sources may include any combination of computing devices, computing platforms, and computing software. The variety of sources may relate to general information request platforms such as, for example, automated chat bots. The variety of sources may also relate to specific request platforms such as, for example, service request platforms.

At step S404, confidence scores may be determined for the inputs. The confidence scores may be automatically determined in real-time, in near real-time, as well as in a batch by using a model. In an exemplary embodiment, the confidence scores may relate to a clarity level of the natural language data. The clarity level may correspond to a predicted coherency characteristic of the natural language data as determined by the model. The clarity level may include at least one from among a clear level, a high clarity level, a medium clarity level, and a low clarity level.

The clear level may indicate that the natural language input is coherent, clearly understandable, and includes all necessary supplemental information. Alternatively, the low clarity level may indicate that the natural language input is deficient because the natural language input has either too little information, i.e., insufficient description of the requested service, or too much information, i.e., multiple service requests in one service ticket. Consistent with present disclosures, the high clarity level and the medium clarity level may include any combination of predicted coherency characteristics that describe a situation between the clear level and the low clarity level.

In another exemplary embodiment, to determine the confidence scores, the input may be parsed to identify linguistic elements from the natural language data. The linguistic elements may relate to distinct meaningful elements of a natural language such as, for example, the English language that is usable alone or with other meaningful elements to describe an idea. The linguistic elements may correspond to at least one from among words, phrases, and any delineations that provide contextual meaning. Then, the confidence scores for the inputs may be determined based on a mapping of interactions between each of the linguistic elements. Consistent with present disclosures, the confidence scores may be automatically determined in real-time, in near real-time, as well as in a batch by using the model.

In another exemplary embodiment, context for each of the linguistic elements may be determined based on word sense disambiguation. The context may be determined by using the model to facilitate the determining of the confidence scores. The word sense disambiguation process may relate to a procedure to identify which sense of a word is meant in a sentence and/or another segment of context.

For example, the model may utilize a dictionary to specify the senses which are to be disambiguated to determine context for a corpus of language data to be disambiguated. Then, the confidence scores for the inputs may be determined based on the linguistic elements and the corresponding context. Consistent with present disclosures, the confidence scores may be automatically determined in real-time, in near real-time, as well as in a batch by using the model.

In another exemplary embodiment, the model may include at least one from among a natural language processing model, a machine learning model, a statistical model, a mathematical model, a process model, and a data model. The model may also include stochastic models such as, for example, a Markov model that is usable to model randomly changing systems. For stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori algorithm analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

At step S406, whether the confidence scores exceed predetermined thresholds may be determined. Whether the confidence scores exceed the predetermined thresholds may be automatically determined in real-time, in near real-time, as well as in a batch by using the model. In an exemplary embodiment, a comparison may be made between each of the confidence scores and the corresponding predetermined thresholds. For example, a low confidence score that is less than the corresponding predetermined threshold may indicate that the input is unclear and/or incomplete. Alternatively, a high confidence score that is more than the corresponding predetermined threshold may indicate that the input is clear and no additional information is required for further processing.

In another exemplary embodiment, the predetermined thresholds may be adjustable based on user preference. The predetermined thresholds may be adjusted up or down by a user based on circumstance. The user may interact with a graphical user interface to provide or update the predetermined thresholds. In another exemplary embodiment, the thresholds may be dynamically adjusted by the model based on predetermined guidelines. The predetermined guidelines may include at least one from among a business guideline, an operation guideline, and a regulatory guideline. For example, regulatory guidelines may dictate that sensitive requests require a higher level of clarity, and thus, a higher threshold than generic informational requests.

At step S408, requests for additional information may be generated when the confidence scores are below the predetermined thresholds. The requests may be automatically generated in real-time, in near real-time, as well as in a batch by using the model. In an exemplary embodiment, the requests may include a prompt in a natural language format. The requests may be generated in a data type that corresponds to the input. For example, when a natural language input is received in a textual data type, the request may be generated in a matching textual data type.

In another exemplary embodiment, the additional information may correspond to clarifying information that resolves the ambiguity and/or incompleteness of the input. The clarifying information may be determined by using the model based on the input. For example, the model may determine that specific error data is required for an unclear service request input to resolve the ambiguity. In this situation, a request together with a prompt for the specific error data may be generated.

At step S410, the requests may be transmitted back to the corresponding source via the application programming interface. In an exemplary embodiment, the requests may be transmitted back to the corresponding source by using an interface that is similar to the interface that was used by the source to transmit the initial input. For example, when an unclear input is made by using a service request platform, the requests may be transmitted back to the service request platform to ask for the clarifying information.

In another exemplary embodiment, subsequent inputs may be received from the sources in response to the corresponding requests. The subsequent inputs may be received from the sources via the application programming interface. The subsequent inputs may be received in the same format as the initial input by using the same communication interface. For example, the subsequent inputs may be received as a textual message from a chat interface when the initial input is a textual inquiry that is made on the chat interface. The subsequent inputs may include the requested additional information in a natural language format. Consistent with present disclosures, the additional information may include clarification data that provides context for the initial input. For example, the clarification data may indicate that the service request is related to the functionality of a specific plug-in within an email management platform when the initial input is unclear.

Then, new confidence scores may be determined based on the inputs and the corresponding subsequent inputs. The new confidence scores may be automatically determined in real-time, in near real-time, as well as in a batch by using the model. The new confidence scores may relate to a clarity level of the natural language data. For example, the additional information from the subsequent inputs and the data from the initial inputs may be usable by the model to determine new confidence scores that reflect the contextual clarifications. Consistent with present disclosures, whether the new confidence scores exceed the predetermined thresholds may be determined. Whether the new confidence scores exceed the predetermined thresholds may be automatically determined in real-time, in near real-time, as well as in a batch by using the model.

In another exemplary embodiment, the inputs may be automatically split into a plurality of constituent inputs based on the subsequent inputs and the new confidence scores. For example, an input that corresponds to a single service ticket may be automatically split into a plurality of service tickets based on the clarifying data. The inputs may be automatically split into the plurality of constituent inputs based on the contextual clarification that is provided by the additional information in the subsequent inputs. For example, the additional information may indicate that the single service ticket includes multiple service requests that are best handled separately.

Moreover, each of the plurality of constituent inputs may include contextually distinct subject matter as determined by the model. The model may be usable to identify and group subject matters that are related as well as separate unrelated subject matters. For example, the model may be usable to identify service issues related to a particular plug-in and separate them from other service issues related to the email management platform as a whole. The model may use information that relates to at least one from among the initial inputs, the subsequent inputs, the initial confidence scores, as well as the new confidence scores to delineate the contextually distinct subject matter.

In another exemplary embodiment, destinations for each of the inputs may be determined when the corresponding confidence scores exceed the predetermined thresholds. Consistent with present disclosures, the destinations may be determined for the initial inputs when the corresponding confidence scores exceed the predetermined thresholds. Likewise, the destinations may be determined for the initial inputs according to the additional clarifying information when the corresponding new confidence scores exceed the predetermined thresholds.

The destinations may correspond to downstream applications such as, for example, classification and metadata tagging applications that are configured to further process the inputs. Together with the destinations, corresponding network location information may be determined to facilitate the downstream transmission. For example, network location information such as a type of communication interface may be determined for each of the downstream application to facilitate downstream transmission of the inputs.

Then, the inputs may be associated with the corresponding confidence scores. The association may be centrally persisted to improve ease of management. For example, the association between the inputs and the corresponding confidence scores may be centrally stored in one location for easy management of the data. The association may also be appended to input metadata to improve ease of access. For example, the association between the inputs and the corresponding confidence scores may be appended to the metadata of the inputs for easy access to the association information by downstream applications. Consistent with present disclosures, any combination of the input and the associated confidence scores may be transmitted to the corresponding destinations for further processing.

Figure 5:
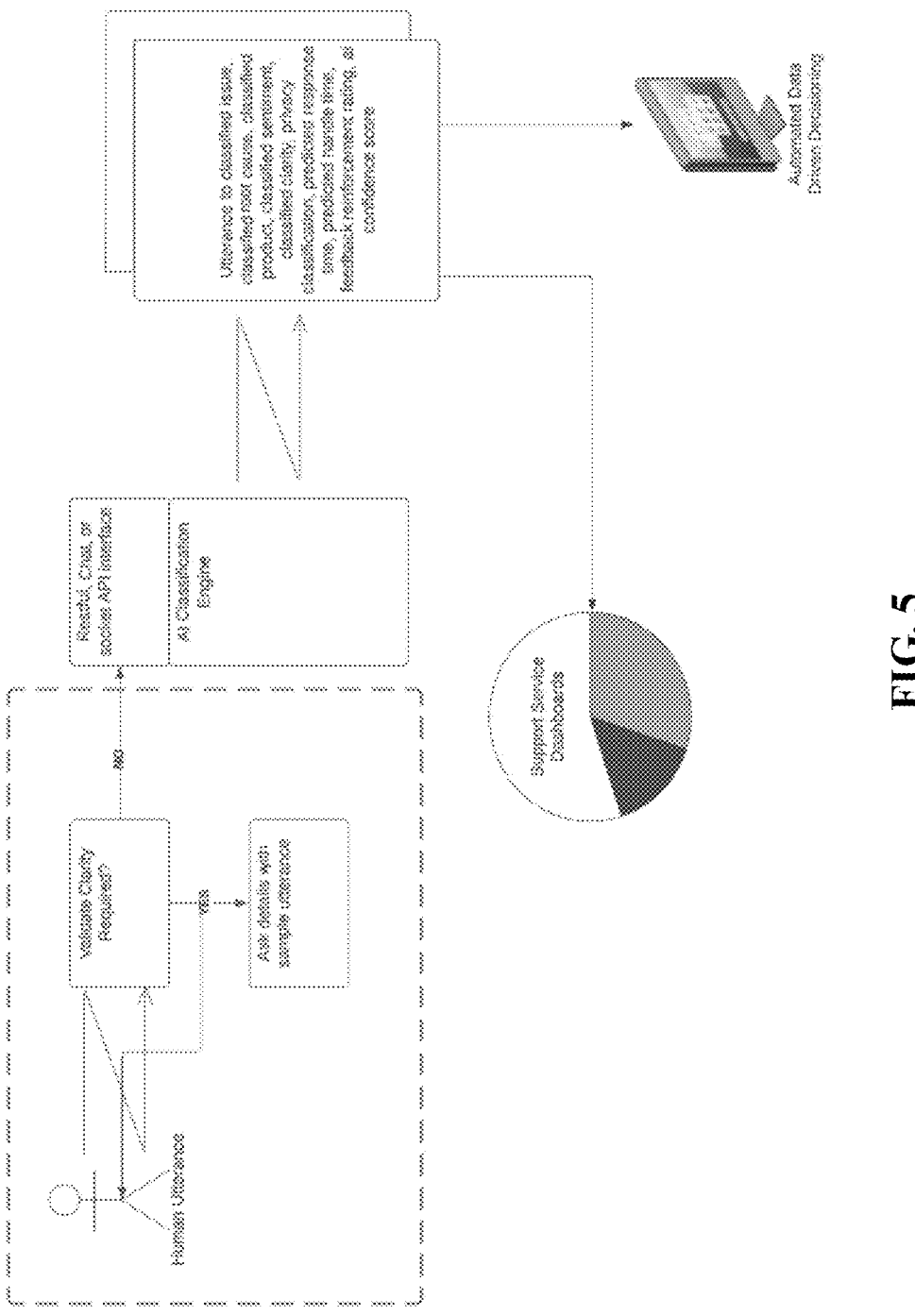
FIG. 5 is a flow diagram of an exemplary process for implementing a method for providing an automated machine learning solution that leverages artificial intelligence to facilitate qualitative assessment of natural language data in real-time.

FIG. 5 is a flow diagram 500 of an exemplary process for implementing a method for providing an automated machine learning solution that leverages artificial intelligence to facilitate qualitative assessment of natural language data in real-time. In FIG. 5, the automated machine learning solution may be usable to flag unclear initial utterances. The automated machine learning solution may provide feedback to input systems when there is enough input to perform a desired function such as, for example, classifying human utterance. Similarly, the automated machine learning solution may provide feedback to input systems when there is enough input to reliably respond to an issue such as, for example, a service request based on the human utterance.

As illustrated in FIG. 5, the disclosed invention may serve as an initial processing stage that facilitates automated qualitative assessments of natural language data. The disclosed invention may leverage artificial intelligence and/or machine learning to validate the clarity of received human utterances for downstream applications. By initially validating the clarity of the received human utterances and requesting additional information, when necessary, the disclosed invention may be usable to ensure that the inputs received by the downstream applications are complete and unambiguous.

Consistent with present disclosures, the disclosed invention may receive human utterance from a variety of sources such as, for example, a chat or a service ticket and determine whether additional details are needed. When the human utterance is clear and/or no additional details are needed, the disclosed invention may pass the input to the downstream applications for further processing. When the human utterance is unclear and/or additional details are needed, the disclosed invention may generate prompts in a natural language format to request clarifying information. Once a sufficient amount of clarifying information is received, the disclosed invention may pass the input together with the clarifying information to the downstream applications for further processing.

In another exemplary embodiment, the downstream applications may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

Accordingly, with this technology, an optimized process for providing an automated machine learning solution that leverages artificial intelligence to facilitate qualitative assessment of natural language data in real-time is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

19

1. A method for facilitating qualitative assessment of natural language data via artificial intelligence, the method being implemented by at least one processor, the method comprising:

receiving, by the at least one processor via an application programming interface, a first input from at least one source, the first input including the natural language data;

parsing, by the at least one processor via at least one model, the first input to identify at least one linguistic element of a natural language, wherein the at least one model includes a machine learning and pattern recognition model, wherein the machine learning and pattern recognition model includes an artificial neural network;

identifying, by the at least one processor via the at least one model, subject matter of the first input;

delineating, by the at least one processor via the at least one model, the first input into respective contextually distinct input groups based on the identified subject matter;

determining, by the at least one processor using the at least one model, at least one confidence score for each respective contextually distinct input group, the at least one confidence score relating to a clarity level of the natural language data that is determined by using a word sense disambiguation model that identifies a context of the at least one linguistic element of the first input, wherein the at least one model is trained using an assessment model that is based on an error rate associated with the determined at least one confidence score for each respective contextually distinct input group;

for each respective contextually distinct input group, determining, by the at least one processor using the at least one model, whether the at least one confidence score exceeds a predetermined threshold;

determining, by the at least one processor and based on the first input, a respective corresponding downstream application for a respective corresponding contextually distinct input group when the at least one confidence score exceeds a predetermined threshold, wherein the respective corresponding downstream application relates to a classification and metadata tagging operation for processing the first input;

processing, by the at least one processor via the respective corresponding downstream application, each respective contextually distinct input group, wherein a result of the processing of each respective contextually distinct input group is used to further train the at least one model;

generating, by the at least one processor using the at least one model, at least one request for additional information when the at least one confidence score is below the predetermined threshold, the at least one request including a prompt in a natural language format; and transmitting, by the at least one processor via the application programming interface, the at least one request back to the at least one source;

receiving, by the at least one processor via the application programming interface, a second input from the at least one source in response to the at least one request, the second input including the additional information;

determining, by the at least one processor using the at least one model, at least one new confidence score based on the first input and the second input; and determining, by the at least one processor using the at least one model, whether the at least one new confidence score exceeds the predetermined threshold,

wherein the first input is automatically separated into a plurality of constituent inputs of the first input based on contextual information provided by the second input and the at least one new confidence score, each of the plurality of constituent inputs including contextually distinct subject matter.

2. The method of claim 1, further comprising:

associating, by the at least one processor, the first input with the at least one confidence score; and transmitting, by the at least one processor, the first input and the associated at least one confidence score to the respective corresponding downstream application.

3. The method of claim 2, wherein the respective corresponding downstream application includes network location information for the transmitting of the first input and the associated at least one confidence score.

4. The method of claim 1, wherein the clarity level includes at least one from among a clear level, a high clarity level, a medium clarity level, and a low clarity level, the clarity level corresponding to a predicted coherency characteristic of the natural language data.

5. The method of claim 1, wherein the at least one model further includes at least one from among a natural language processing model, a machine learning model, a mathematical model, a process model, and a data model.

6. A computing device configured to implement an execution of a method for facilitating qualitative assessment of natural language data via artificial intelligence, the computing device comprising:

a processor;

a memory; and a communication interface coupled to each of the processor and the memory, wherein the processor is configured to:

receive, via an application programming interface, a first input from at least one source, the first input including the natural language data;

parse, via at least one model, the first input to identify at least one linguistic element of a natural language, wherein the at least one model includes a machine learning and pattern recognition model, wherein the machine learning and pattern recognition model includes an artificial neural network;

identify, via the at least one model, subject matter of the first input;

delineate, via the at least one model, the first input into respective contextually distinct input groups based on the identified subject matter;

determine, by using the at least one model, at least one confidence score for each respective contextually distinct input group, the at least one confidence score relating to a clarity level of the natural language data that is determined by using a word sense disambiguation model that identifies a context of the at least one linguistic element of the first input, wherein the at least one model is trained using an assessment model that is based on an error rate associated with the determined at least one confidence score for each respective contextually distinct input group;

for each respective contextually distinct input group, determine, by using the at least one model, whether the at least one confidence score exceeds a predetermined threshold;

determine, based on the first input, a respective corresponding downstream application for a respective corresponding contextually distinct input group when the at least one confidence score exceeds a predetermined threshold, wherein the respective corresponding downstream application relates to a classification and metadata tagging operation for processing the first input;

process, via the respective corresponding downstream application, each respective contextually distinct input group, wherein a result of the processing of each respective contextually distinct input group is used to further train the at least one model;

generate, by using the at least one model, at least one request for additional information when the at least one confidence score is below the predetermined threshold, the at least one request including a prompt in a natural language format;

transmit, via the application programming interface, the at least one request back to the at least one source;

receive, via the application programming interface, a second input from the at least one source in response to the at least one request, the second input including the additional information;

determine, via the at least one model, at least one new confidence score based on the first input and the second input; and determine, via the at least one model, whether the at least one new confidence score exceeds the predetermined threshold, wherein the first input is automatically separated into a plurality of constituent inputs of the first input based on contextual information provided by the second input and the at least one new confidence score, each of the plurality of constituent inputs including contextually distinct subject matter.

7. The computing device of claim 6, wherein the processor is further configured to:

associate the first input with the at least one confidence score; and transmit the first input and the associated at least one confidence score to the respective corresponding downstream application.

8. The computing device of claim 7, wherein respective corresponding downstream application includes network location information for the transmitting of the first input and the associated at least one confidence score.

9. The computing device of claim 6, wherein the clarity level includes at least one from among a clear level, a high clarity level, a medium clarity level, and a low clarity level, the clarity level corresponding to a predicted coherency characteristic of the natural language data.

10. The computing device of claim 6, wherein the at least one model further includes at least one from among a natural language processing model, a machine learning model, a mathematical model, a process model, and a data model.

11. A non-transitory computer readable storage medium storing instructions for facilitating qualitative assessment of natural language data via artificial intelligence, the storage medium comprising executable code which, when executed by a processor, causes the processor to:

receive, via an application programming interface, a first input from at least one source, the first input including the natural language data;

parse, via at least one model, the first input to identify at least one linguistic element of a natural language, wherein the at least one model includes a machine learning and pattern recognition model, wherein the machine learning and pattern recognition model includes an artificial neural network;

identify, via the at least one model, subject matter of the first input;

delineate, via the at least one model, the first input into respective contextually distinct input groups based on the identified subject matter;

determine, by using the at least one model, at least one confidence score for each respective contextually distinct input group, the at least one confidence score relating to a clarity level of the natural language data that is determined by using a word sense disambiguation model that identifies a context of the at least one linguistic element of the first input, wherein the at least one model is trained using an assessment model that is based on an error rate associated with the determined at least one confidence score for each respective contextually distinct input group;

for each respective contextually distinct input group, determine, by using the at least one model, whether the at least one confidence score exceeds a predetermined threshold;

determine, based on the first input, a respective corresponding downstream application for a respective corresponding contextually distinct input group when the at least one confidence score exceeds a predetermined threshold, wherein the respective corresponding downstream application relates to a classification and metadata tagging operation for processing the first input;

process, via the respective corresponding downstream application, each respective contextually distinct input group, wherein a result of the processing of each respective contextually distinct input group is used to further train the at least one model;

generate, by using the at least one model, at least one request for additional information when the at least one confidence score is below the predetermined threshold, the at least one request including a prompt in a natural language format;

transmit, via the application programming interface, the at least one request back to the at least one source;

receive, via the application programming interface, a second input from the at least one source in response to the at least one request, the second input including the additional information;

determine, via the at least one model, at least one new confidence score based on the first input and the second input; and determine, via the at least one model, whether the at least one new confidence score exceeds the predetermined threshold, wherein the first input is automatically separated into a plurality of constituent inputs of the first input based on contextual information provided by the second input and the at least one new confidence score, each of the plurality of constituent inputs including contextually distinct subject matter.

* * * * *